Patented Aug. 7, 1945

2,380,983

UNITED STATES PATENT OFFICE 2,380,983

PRESSURE RESPONSIVE MECHANISM

Frank C. Mock, South Bend, Ind., assignor to Bendix Products Corporation, South Bend, Ind., a corporation of Indiana Application December 16, 1941, Serial No. 423,249

7 Claims. (Cl. 137—157)

This invention relates to pressure responsive mechanism and more particularly to diaphragms for use in systems requiring high sensitivity and uniform responsiveness through the major portion of the diaphragm stroke. The present application is a continuation-in-part of my copending application, Serial No. 202,206, filed April 15, 1938.

Diaphragms of various types and materials have long been used in various mechanisms for transforming a pressure into an actuating force controlling some part of the mechanism. For several reasons, however, they have not been entirely satisfactory in some installations and have not been used at all in others. In some cases it has been difficult or impossible to obtain the desired stroke with a diaphragm, particularly if the diameter is small. In others, the internal friction or hysteresis of the diaphragm, which interferes with its always returning to the same position for a given pressure, has made the use of a diaphragm unsatisfactory. In still other cases a diaphragm is unsatisfactory because of the change in its mean effective area as it is displaced. Thus, the unsupported slack in a flat diaphragm supported at its outer edges and secured to a movable control rod at its center, will take the form of a catenary under the differential of pressures on opposite sides thereof. The mean effective area will therefore change from that of the central supported area to that of the outer supported area upon displacement of the diaphragm from one extreme position to the other. This factor renders a diaphragm unsatisfactory in cases where a constant pressure-force ratio is required through a portion of the working stroke.

It is accordingly an object of the present invention to provide an improved diaphragm.

It is a further object of the invention to provide a diaphragm having a minimum hysteresis.

It is a further object of the invention to provide a diaphragm which may be moved through relatively large displacements without excessive wear.

Another object of the invention is to provide a relatively strong diaphragm having a high degree of sensitivity.

A still further object of the invention is to provide a relatively strong diaphragm having a high degree of sensitivity and capable of a relatively large stroke.

Many other objects and advantages of the invention will be readily apparent from the following description of the accompanying drawings, representing certain preferred embodiments. After considering these examples, skilled persons will understand that many variations may be made without departing from the principles disclosed and I contemplate the employment of any structures, arrangements or modes of operation that are properly within the scope of the appended claims.

Figure 1:
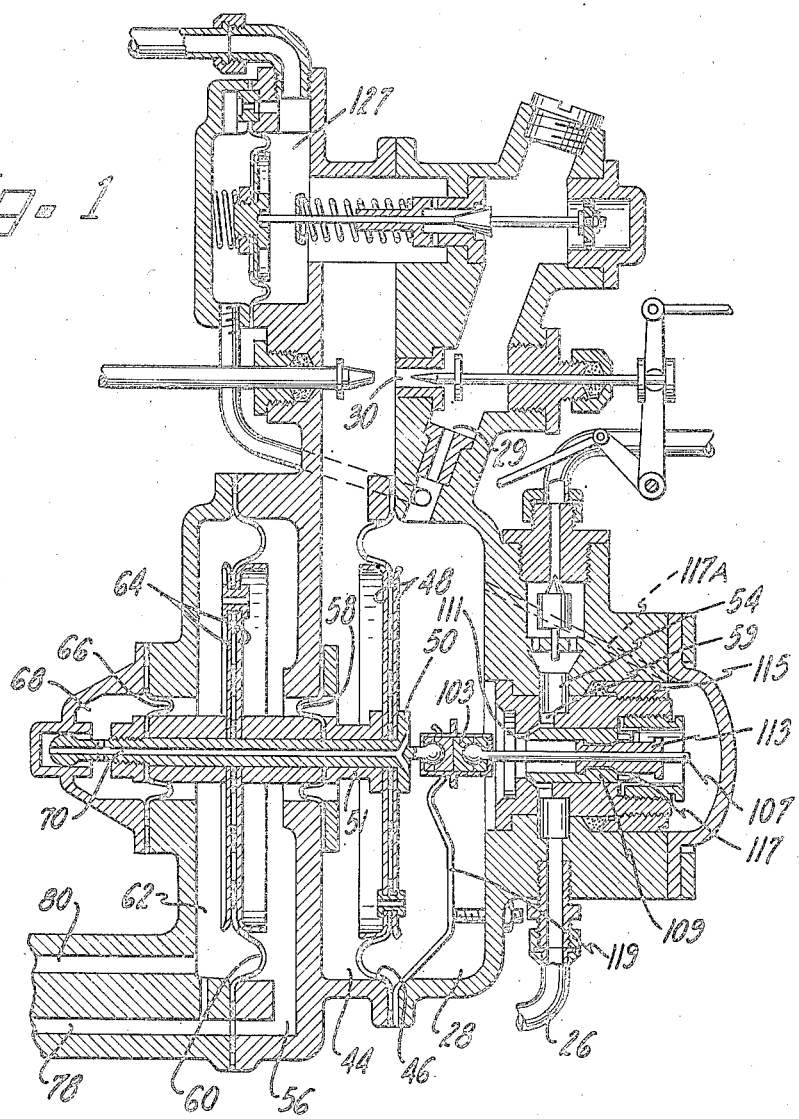
Figure 1 is an enlarged fragmentary sectional view of regulator mechanism for a charge-forming device utilizing diaphragms in accordance with the invention.

Referring first to Figure 1, the parts therein shown constitute the major portion of the regulator section or unit of the charge-forming device of Figure 1 of application Serial No. 202,206, above noted, and bear the same reference numerals. Briefly, this unit consists of fuel and air pressure differential chambers 28, 44, 56 and 62. The chambers 28 and 44 are separated by flexible diaphragm 46 having an annular groove of substantially semi-circular cross-section contour preformed therein. The peripheral edge portion of the diaphragm is secured in sealed relation between opposed casing flanges and the central portion thereof between a pair of disks 48, the latter in turn being secured to a rod 50 which at its right end is connected to a valve stem 107 of a fuel inlet valve 109 through a universal connection 108 so that the parts are free to align themselves and thereby decrease side pressure on the rod or valve which might cause binding. Valve 109 is carried by a plug 113 threaded on valve stem 107 (see Fig. 7), the valve assembly being held in place by means of an outer nut 115 which may be removed for disassembly without disturbing adjustment of the poppet valve on the valve stem relative to the diaphragm. A small diaphragm 117 serves to seal the outer end of the valve member to prevent fuel from escaping. A passage 117a communicates the fuel chamber 28 with the space to the right of the diaphragm 117, the latter being equal in effective area to the effective area of the valve seat 111 and thereby acts to balance the unbalance which would otherwise result from the differential in pressure across valve 109. An idle spring 119 engages connection 103 and provides an adjustable enrichment at idling speeds.

Unmetered fuel is delivered to chamber 28 by a source of constant pressure such as a fuel pump, not shown, through pipe 26, annular chamber 54, ports 59 past valve 109 and its seat 111 and into said chamber 28; and passes from the latter through fixed metering orifice 29, and then through adjustable metering orifice 30 and at times through economizer valve 127, into chamber 44, from which the metered fuel flows to a valve-controlled discharge or spray nozzle unit, not shown, which may be set to open at a minimum discharge pressure, as for example, 5 or 6 pounds.

It will thus be seen that chamber 28 is subjected to unmetered fuel pressure and chamber 44 to metered fuel pressure, the pressure in chamber 28 being equivalent to discharge nozzle pressure plus the drop in pressure across the metering orifices 29, 30, and that in chamber 44 being equivalent to discharge nozzle pressure.

Chambers 56 and 62 are separated from one another by a relatively large diaphragm 60 similar to diaphragm 46, while a relatively small sealing diaphragm 58 separates chamber 56 from chamber 44, said diaphragms each having a deep annular groove preformed therein. The rod 50 is provided with cylindrical hub members 51 whereby it is secured in sealed relation to the disks 48 of diaphragm 46, the small sealing diaphragm 58 and disks 64 of diaphragm 60. Another sealing diaphragm 66 is secured to the left end of rod 50 and separates chambers 62 from end chamber 68. Chambers 28 and 68 are interconnected by a pressure-equalizing passage 70 formed in rod 50, to balance out unavoidable pressure effects of diaphragms 58 and 66.

Chamber 56 is subjected to venturi suction through passage 78, while chamber 62 is subjected to air scoop pressure through passage 80. When the engine is in operation, it draws air through the air conduit, not shown, and a differential pressure is thus created between the air scoop and venturi, also not shown, which is a function of the rate of air flow. This differential in pressure acting in chambers 56 and 62 creates a net force tending to move rod 50 to the right in a direction to open the valve 109. If this force were unopposed, the rod 50 and valve 109 would move to the extreme right. However, as the valve 109 opens, fuel supplied under pressure to valve chamber 54 flows into the unmetered fuel chamber 28, through the metering orifices, into the metered fuel chamber 44, and thence to the discharge jet as heretofore noted. A differential in pressure between chambers 28 and 44 is therefore created which is equivalent to the pressure drop across orifice 29 and passage 30 and is a function of the rate of fuel flow therethrough. Since the pressure in chamber 44 is maintained within relatively narrow limits by the setting of the discharge nozzle, or discharge pressure, opening of valve 109 will increase the pressure in chamber 28 (due to decreased throttling loss across said valve) thereby increasing the differential pressure across the metering orifices and increasing the rate of fuel flow. The differential in pressure between chamber 44 and chambers 28 and 68 will exert a force on rod 50 tending to move it to the left or in a direction to close valve 109, thus opposing the force on rod 50 created by venturi suction. Thus the rod 50 will adjust itself to a point of equilibrium such that the differential across the fuel metering orifices is equal to the differential pressure between the air scoop and venturi. If now the pressure of fuel delivered to chamber 28 is increased, as by faulty pump action, the increased pressure in said chamber will cause valve 109 to move towards closed position thereby restoring the fuel metering differential pressure to its original value. If engine speed is decreased, the rate of air flow through the venturi decreases, thereby decreasing the differential pressure acting on diaphragm 60, causing valve 109 to move towards closed position and thus decreasing the fuel flow to compensate for the decreased rate of air flow. The rate of fuel flow is therefore directly controlled by the rate of air flow and a constant mixture of fuel and air obtained.

The success of a charge forming device such as is shown in Figure 1 largely depends upon the diaphragms. They must be strong enough to withstand the pressures encountered and must be resistant to gasoline or other hydro-carbon fluid. Also, in order to satisfactorily proportion the fuel and air they must have a very low hysteresis factor so as to respond to very small changes in the actuating differential pressures, and must maintain a constant mean effective area throughout the working stroke so as to create a force on the control rod which varies in direct proportion to the differential pressures thereacross regardless of the particular position in the stroke.

If the hysteresis or internal friction is too great, the fuel and air proportioning will be erratic, particularly at low rates of fuel and air flow when the differential air pressure for actuating the device is but an inch or so of water. If, for example, it required but one-tenth of an inch of water differential pressure to overcome the internal diaphragm friction, a maximum variation of two-tenths of an inch of water would be experienced, taking into consideration motion of the rod in both directions. Thus, for a given air differential of one inch of water, the fuel differential pressure could vary from nine-tenths to eleven-tenths, a variation of over twenty percent. Inconsistent metering would obviously result.

If the diaphragms 46 and 60 were flat diaphragms, a movement to the right of control rod 50 would result in an increase in the mean effective area of the diaphragm 46 and a decrease in that of diaphragm 60. This is because the base of the catenary curve, which the unsupported portion of a flat type diaphragm tends to assume, would shift outwardly for diaphragm 46 and inwardly for diaphragm 60. Thus, with increased air flow, resulting in movement of the control rod 50 to the right, the air differential would become decreasingly effective in creating an air metering force and the fuel differential would become increasingly effective in creating a fuel metering force. Constant fuel-air proportioning would not be obtained with such an arrangement.

Difficulties such as these are overcome in the present device by the form and arrangement of the diaphragms and by the material and process used in making them. With reference to the sealing diaphragms 58 and 66, they are provided with deep annular grooves, the sides of which lie respectively against the members 51 and outer walls, as clearly shown in Figure 2, to give a rolling action against the confining walls. The cross-sectional contour of the grooves comprises a substantially semi-circular portion 201, and straight-sided portions 202. The length or extent of the portions 202 may vary from substantially zero to any desired amount depending upon the stroke desired. Due to this construction and the differential in fluid pressure which exists on the two sides of the diaphragms, the grooves maintain a substantially constant effective radius as the rod 50 moves, so that the effective areas of the diaphragms remain substantially constant regardless of movement of the rod 50. The grooves are provided in the diaphragms by molding or forming by pressure during curing, as distinguished from forming or shaping the fabric by the use of a stiffener prior to the application and curing of the rubber-like material, and therefore assume their normal working position even at a zero differential pressure, in contrast to an unformed diaphragm, such as a flat diaphragm provided with slack, in which the mean effective area does not become definitely determined until the differential thereacross is sufficient to force the diaphragm to assume its working position. The formed diaphragm assumes its normal position without internal diaphragm stress, whereas the unformed diaphragm must be internally stressed before it will assume such a position.

The sealing diaphragms 58 and 66 are preferably made of synthetic rubber-like substances, such as the one commercially available under the trade name "Duprene," or other suitable flexible material which may be formed and cured so as to have the desired configuration under zero stress. They may be made from a pellet of uncured stock by die-molding and curing.

The large actuating diaphragms are preferably made from fabric coated or impregnated with "Duprene," rubber-like substances or other materials, the fabric largely serving to increase the bursting strength of the diaphragm. Several thin coats or sheets of such materials are applied to each side of the fabric so that any air bubble or imperfection in one coat will be sealed by the other coats. I have found that a superior diaphragm is obtained by applying uncured stock to the fabric, forming the diaphragm grooves while the stock is substantially uncured, and then curing. The forming is done while the rubber-like stock is substantially uncured, that is, while the rubber-like material is insufficiently cured to form a bond to the textile, in order that the threads of the fabric may readily shift or stretch relative to the rubber-like material during the forming process. With the latter method a stronger and more flexible diaphragm is obtained because the rubber-like material of the formed diaphragm is free of the internal or residual stress which is present when semi-cured stock is stressed by forming, and then cured. Also, the semi-cured stock tends to frictionally engage the threads of the fabric and to prevent them from stretching uniformly during the forming process. The fibers or threads may thus be locally stressed to a high value and may be broken. Such defects reduce the bursting strength of the diaphragm and are difficult to locate by inspection because of the rubber-like coating. Also, a diaphragm formed from uncured stock and then cured has a greater resistance to seepage and vapor penetration than one formed from semi-cured stock and then further cured.

Figure 2:
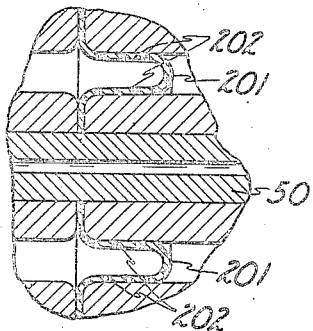
Figure 2 is an enlarged sectional view of the small sealing diaphragms of the device of Figure 1.
Figure 3:
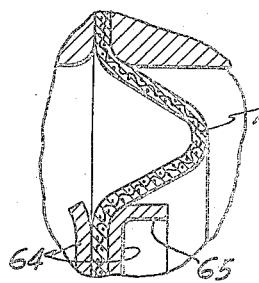
Figure 3 is an enlarged sectional view showing a modified contour of the groove in the large actuating diaphragms of Figure 1.

In Figure 1 the actuating diaphragms are shown with an annular groove of substantially semi-circular cross-section similar to the portion 201 of Figure 2. A modified form of groove for the large fabric impregnated diaphragms is shown in Figure 3, in which the groove is substantially V-shaped having a rounded base portion 210.

Figure 4:
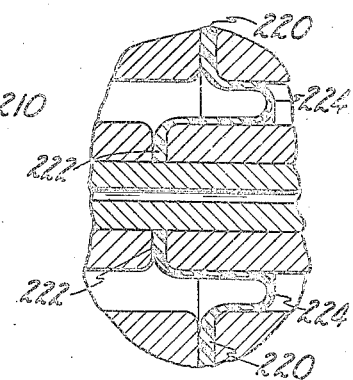
Figures 4 and 5 are sectional views of a further modification of the invention showing the diaphragm at different points of the stroke.
Figure 5:
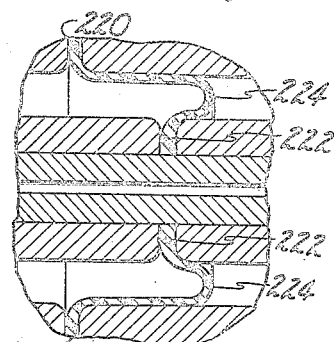

Figures 4 and 5 disclose two positions of a modified form of diaphragm in which the outer flange 220 and center flange or portion 222 are relatively thick and the working section 224 is relatively thin. The thick flanges do not tend to curl up and therefore greatly facilitate handling of the diaphragm and also improve the ease with which the diaphragm and supporting structure may be assembled. The thick flanges are also less likely to be cut or pinched by excessive tightening of the supporting structure assembly. The thin working section insures flexibility.

Although diaphragms of the type shown in Figures 2, 4 and 5 have relatively low residual friction, I have found that it is greatest when the diaphragm is in its free or molded position and least when the planes of the center and outer flanges are relatively displaced from their positions during curing. By installing the diaphragm so that these planes, at least at the time maximum sensitivity is desired, will be relatively displaced from their positions during curing, a somewhat increased sensitivity is obtained. Thus Figure 4 might represent the position of the diaphragm corresponding to the cured position and Figure 5 represent the position of the diaphragm at the time maximum sensitivity is desired. Similarly, the diaphragm could be formed and cured in a position corresponding to extreme diaphragm displacement in one direction such that the working section of the diaphragm, as cured, would be of conical shape interconnecting the two flanged portions of the diaphragm. The foregoing advantage is thus obtained and yet substantially all of the available stroke may be used without encountering the cured position.

Figure 6:
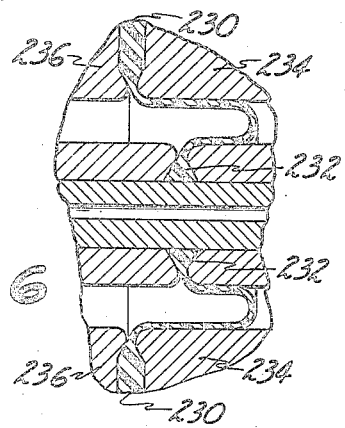
Figure 6 is a sectional view of a further modification of the invention.

In Figure 6 the thickened flanges 230 and 232 are of variable thickness, the thickness decreasing as the working section is approached. The diaphragm engaging surfaces of the supporting structure 234 and 236, and elements 238 and 239 are shaped to substantially conform to the surface of the diaphragm. Any tendency of the diaphragm to pull away from the supporting structure is prevented by the resulting wedging action.

Figure 7:
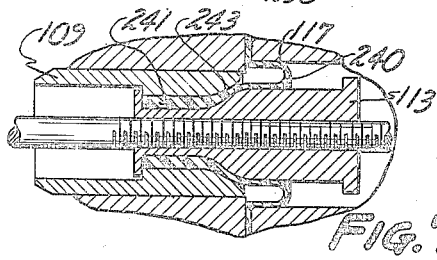
Figure 7 is an enlarged sectional view of the balancing diaphragm of the fuel inlet valve of Figure 1.

The wedge-tightening feature disclosed in Figure 6 is applied in a slightly modified form to the fuel inlet valve balancing diaphragm 117 of Figure 1, Figure 7 being an enlarged cross-sectional view thereof. The diaphragm has a relatively thin working section 240 and a thicker central flange 241. Thus, in order for the center portion of the diaphragm to pull away from the valve 109 and plug 113, the thick flange 241 must be pulled through the small space between the valve and plug at 243. Such action further tightens the diaphragm.

Figure 8:
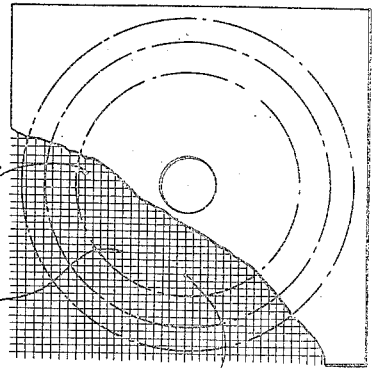
Figure 8 is a plan view diagrammatically illustrating a diaphragm material comprised of fabric of conventional weave impregnated with synthetic gasoline-resistant rubber-like material.

In a fabric type diaphragm the fabric is normally of conventional type in which the sets of threads are at right angles to each other as indicated in Figure 8, the function of the fabric being primarily to increase the strength of a thin diaphragm. The fabric may form an integral part of the diaphragm, as hereinabove discussed, or it may be formed with a groove and used as a separate element for backing up a thin rubber-like diaphragm. In Figure 8 the diaphragm to be formed is indicated as having a central hole 250, a groove designated by lines 252, 253 and an outer periphery 254. As the diaphragm rolls with displacement of the rod, the material must stretch a small amount circumferentially as a particular portion of the diaphragm changes from a position in contact with the surface of the inner supporting structure to one in contact with the surface of the outer supporting structure. This tendency to stretch circumferentially is directly opposed at points 256 and 257 by the horizontal and vertical threads respectively. At an intermediate point such as 258 the stretch is not so greatly resisted by the fabric since it occurs diagonally of the weave. As a result, the diaphragm tends to stretch unevenly around the circumference of the diaphragm.

Figure 9:
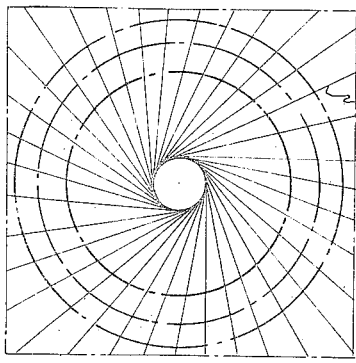
Figure 9 is a view similar to Figure 8 in which the fabric is replaced by substantially radially disposed strength-giving fibers or threads.

In Figure 9 the threads 260 are tangential to a small central base circle. These provide the necessary strength for opposing the pressures applied to the diaphragm but permit uniform circumferential stretching of the diaphragm around the entire periphery, and readily permit the desired rolling action of the diaphragm. Localized wear is thus eliminated. For ease in handling and in assembly, it is preferable to have the threads embedded in the diaphragm. By making the threads tangential to a central base circle, undue thickening of the diaphragm adjacent its center is prevented. A diaphragm of more uniform thickness is thus made possible, and the difficulties in molding caused by such a thickened center are avoided.

Although several modifications of the invention have been shown it will be understood that the scope of the invention is not limited thereto nor otherwise than in accordance with the terms of the appended claims.

I claim:

1. In a diaphragm assembly for a device responsive to small variations in a pressure differential, a molded diaphragm of rubber-like material having a narrow annular groove molded thein inwardly of the periphery and inner and outer attaching flanges, structure engaging the outer flange and closely encircling said groove, and a member engaging the inner flange and closely encircled by said groove and movable relative to the structure in response to the differential pressure across the diaphragm, said assembly being so constructed and arranged that at zero differential pressure across the diaphragm the inner and outer flanges are relatively displaced along the polar axis of the diaphragm from their free as-molded position.

2. A differential-pressure responsive diaphragm comprising a sheet of stiffener-free textile completely covered with cured rubber-like material and having a permanent annular groove therein, said groove being formed and maintained therein by pressure during curing of the uncured material applied to the textile whereby the textile is substantially free of localized internal stresses and the diaphragm has a low hysteresis factor in operation.

3. A diaphragm as set forth in claim 2 wherein the textile sheet is formed of members tangential to a base circle substantially concentric with and of a diameter smaller than that of the annular groove.

4. A differential-pressure responsive diaphragm comprising a single sheet of stiffener-free textile fabric completely covered with cured rubber-like material and having a permanent annular groove therein, said groove being formed and maintained therein by pressure during curing of a multi-coat layer of uncured material applied to a face of the fabric whereby the fabric is substantially free of localized internal stresses and the diaphragm has a low hysteresis factor in operation.

5. A differential-pressure responsive diaphragm comprising a single sheet of stiffener-free textile completely covered with cured rubber-like material and having a permanent annular groove therein, said groove being formed and maintained therein by pressure during curing of the uncured material applied as a thin layer to at least one of the faces of the textile so that the textile will be substantially free of localized internal stresses and the diaphragm will have a low hysteresis factor in operation.

6. A differential-pressure responsive diaphragm comprising a sheet of stiffener-free textile fabric completely covered with cured rubber-like material and having a permanent annular groove therein, said groove being formed and maintained therein by pressure during curing of the uncured rubber-like material applied to both faces of the fabric so that the fabric will be substantially free of localized internal stresses and will have a low hysteresis factor in operation.

7. A differential-pressure responsive diaphragm comprising a sheet of stiffener-free textile completely covered with cured rubber-like material and having a permanent annular groove therein, said groove being formed by pressure applied to the textile treated with substantially uncured rubber-like material and maintained by such pressure while curing the material to an extent sufficient to maintain the groove.

FRANK C. MOCK.